(12) United States Patent
Dombro

(10) Patent No.: US 9,060,502 B1
(45) Date of Patent: Jun. 23, 2015

(54) STRIKE INDICATOR ATTACHMENT TOOL AND FABRICATION METHOD

(76) Inventor: Barry Lee Dombro, Joelton, TN (US)

(*) Notice: Subject to any disclaimer, the term of this patent is extended or adjusted under 35 U.S.C. 154(b) by 330 days.

(21) Appl. No.: 13/572,944

(22) Filed: Aug. 13, 2012

Related U.S. Application Data

(60) Provisional application No. 61/627,731, filed on Oct. 17, 2011.

(51) Int. Cl.
- *A01K 97/12* (2006.01)
- *A01K 93/02* (2006.01)
- *A01K 97/01* (2006.01)

(52) U.S. Cl.
CPC .............. *A01K 93/02* (2013.01); *A01K 97/12* (2013.01); *A01K 97/01* (2013.01)

(58) Field of Classification Search
CPC ....... A01K 97/01; A01K 93/02; A01K 97/12; A01K 93/00
USPC .............................. 43/4, 17, 44.98, 53.5, 54.1
See application file for complete search history.

(56) References Cited

U.S. PATENT DOCUMENTS

| | | | | |
|---|---|---|---|---|
| 2,795,887 A * | 6/1957 | Lockert | ............ | 43/53.5 |
| 3,656,251 A * | 4/1972 | Snider et al. | ............ | 43/17 |
| 3,698,116 A * | 10/1972 | Rosier | ............ | 43/17 |
| 4,342,171 A * | 8/1982 | Cripps et al. | ............ | 43/53.5 |
| 4,590,702 A * | 5/1986 | Chestnutt | ............ | 43/53.5 |
| 4,616,437 A * | 10/1986 | Harvey | ............ | 43/17 |
| 5,216,831 A | 6/1993 | Halterman, Jr. | | |
| 6,397,510 B1 * | 6/2002 | Klein | ............ | 43/17 |
| 6,526,691 B1 * | 3/2003 | Maddox | ............ | 43/53.5 |
| 6,763,629 B1 * | 7/2004 | Bennett | ............ | 43/16 |
| 8,635,803 B1 * | 1/2014 | Cartwright | ............ | 43/17 |
| 2011/0225869 A1 * | 9/2011 | Bennis | ............ | 43/4.5 |

* cited by examiner

*Primary Examiner* — David Parsley
*Assistant Examiner* — George Andonyan

(57) ABSTRACT

A strike indicator attachment tool includes a tool handle, an elongated tool rod extending from the tool handle and a line or leader engaging hook in the tool rod. A method of fabricating a strike indicator on a fishing line or leader includes providing a strike indicator attachment tool having a line or leader engaging hook, snagging the fishing line or leader in the line or leader engaging hook, forming a loop in the fishing line or leader by sliding a strike indicator securing sleeve over the fishing line or leader, extending a bundle of strike indicator threads through the loop and cinching the strike indicator threads by sliding the strike indicator securing sleeve from the fishing line or leader over the bundle of strike indicator threads.

6 Claims, 7 Drawing Sheets

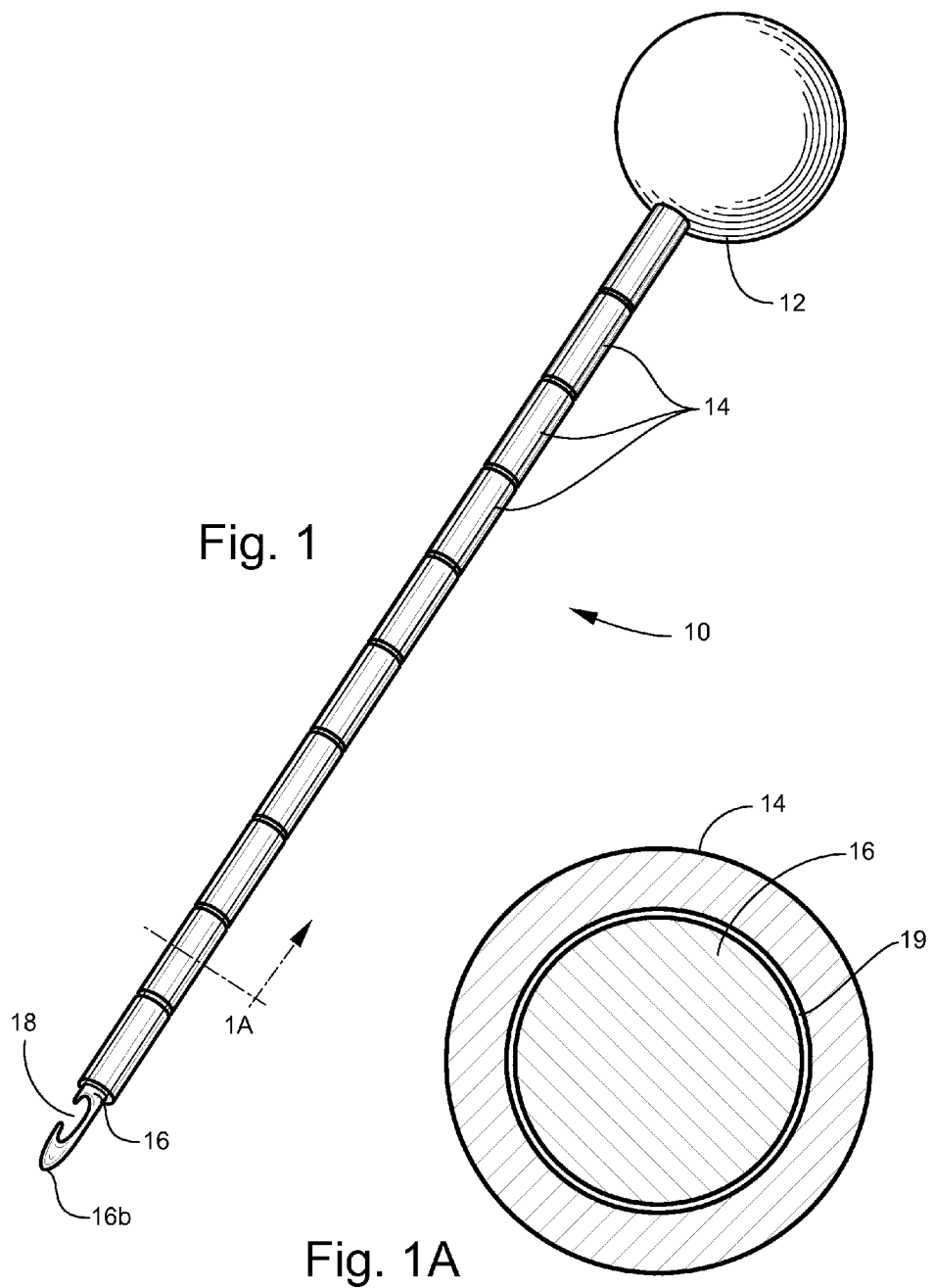

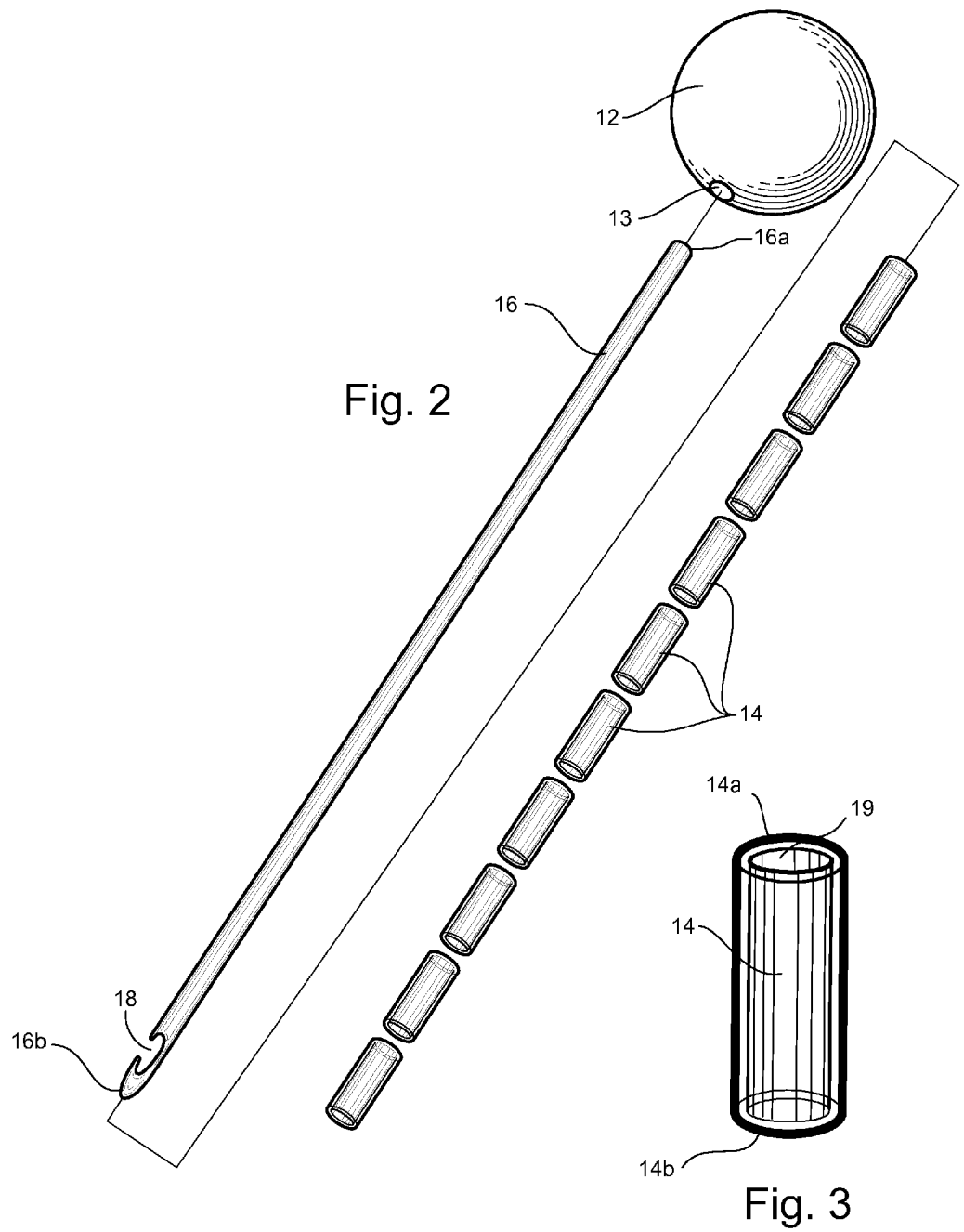

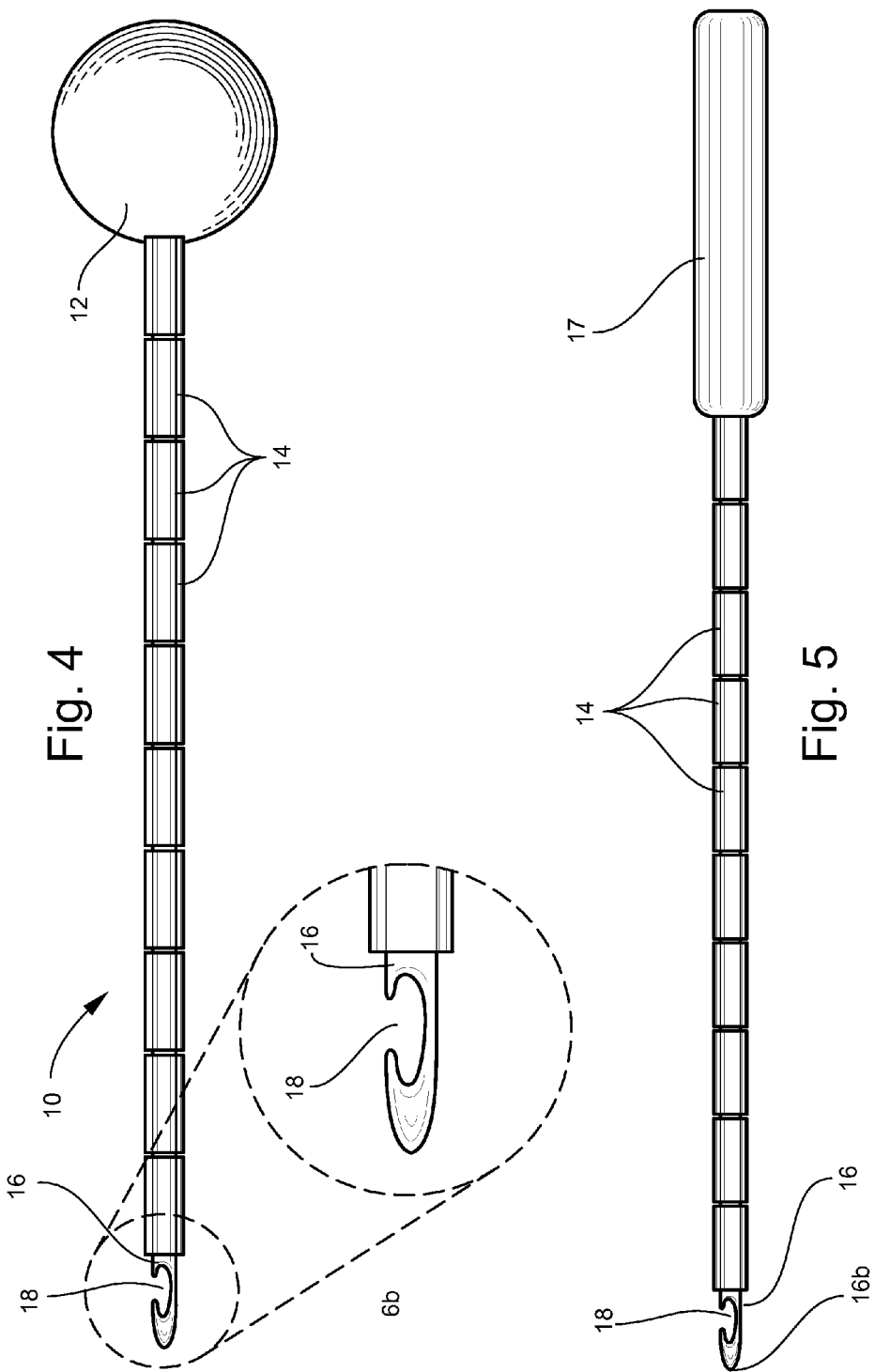

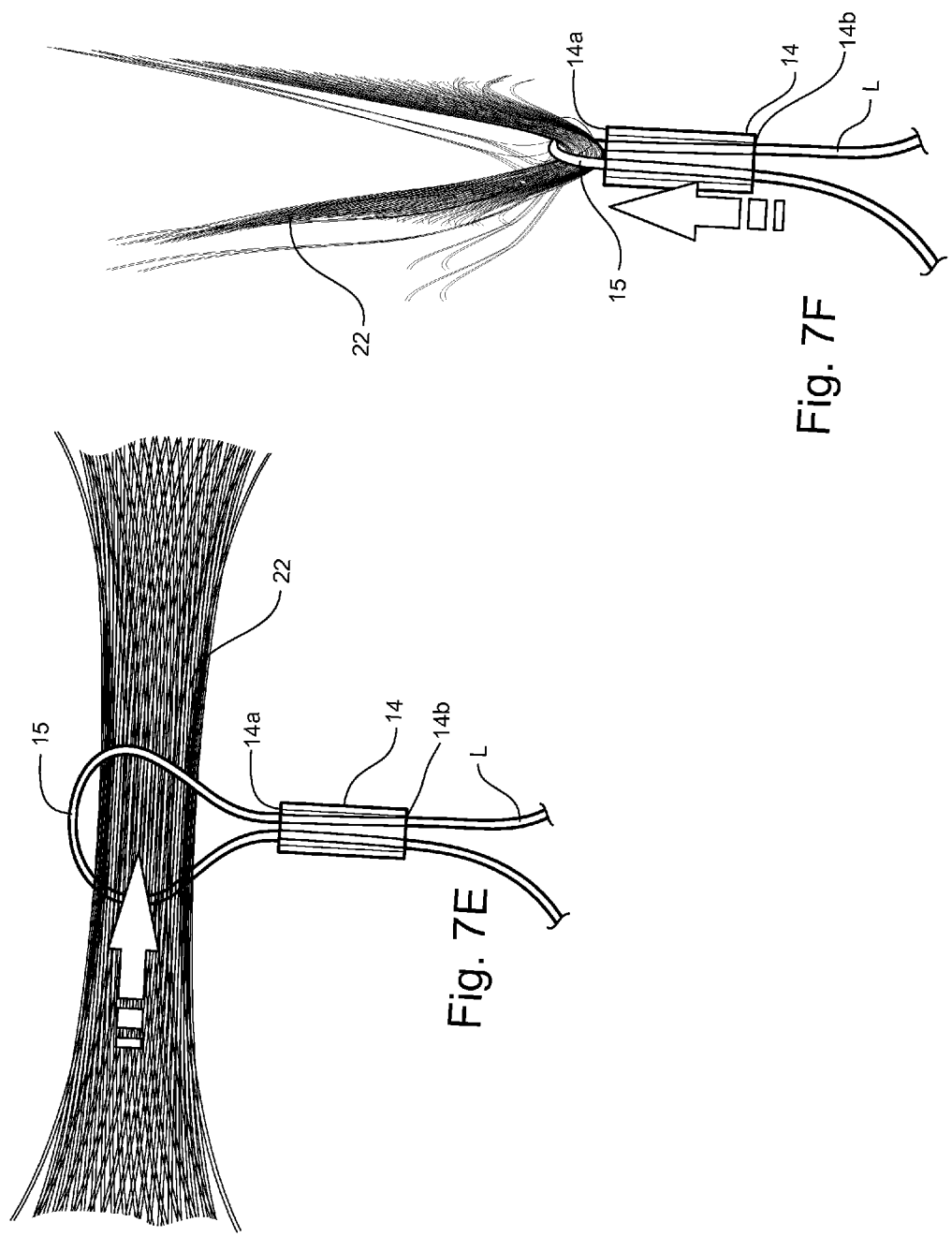

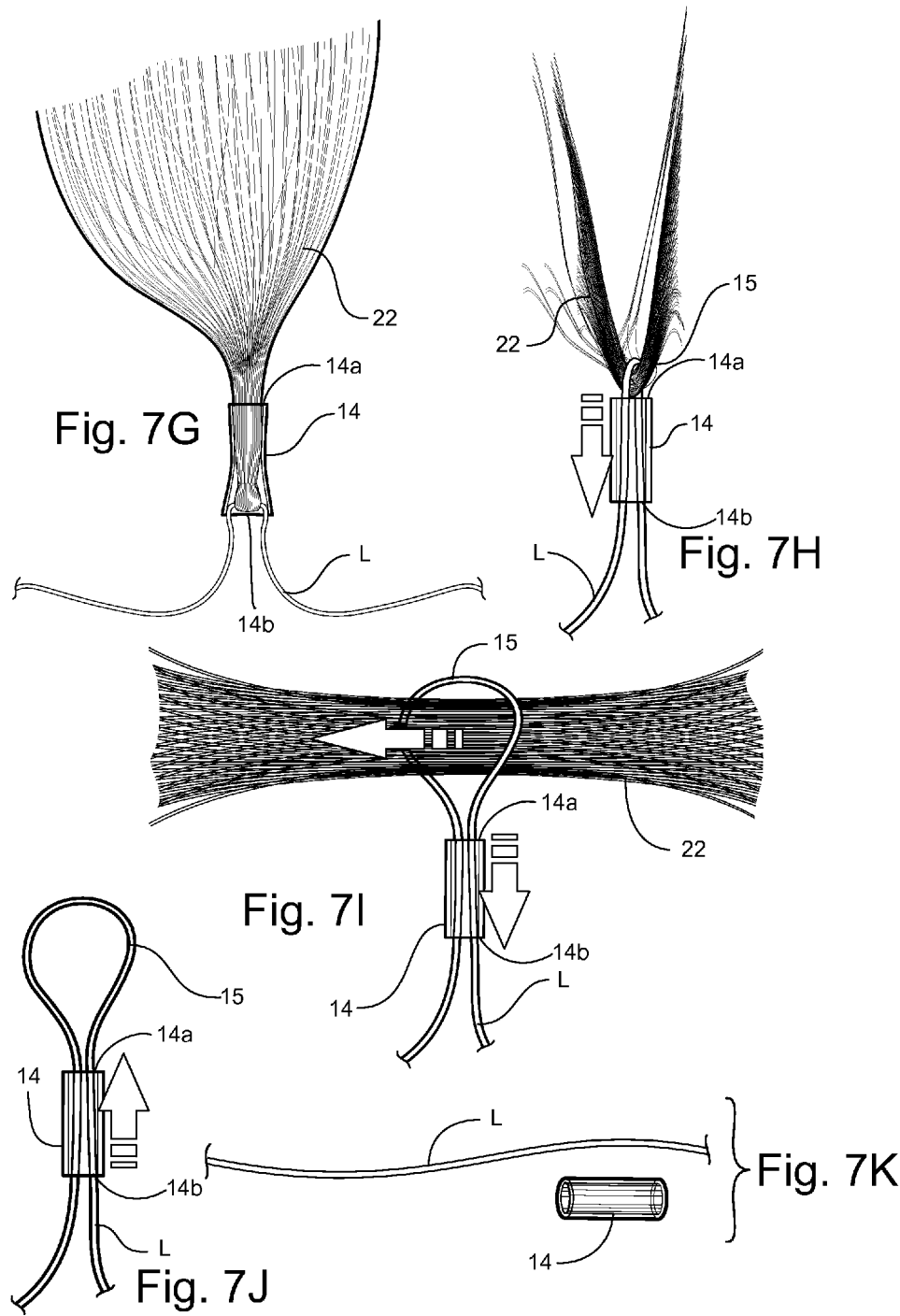

STRIKE INDICATOR ATTACHMENT TOOL AND FABRICATION METHOD

CROSS-REFERENCE TO RELATED APPLICATIONS

This application claims the benefit of U.S. provisional application No. 61/627,731, filed Oct. 17, 2011 and entitled SYSTEM AND METHOD FOR ATTACHING AND REPOSITIONING A STRIKE INDICATOR FOR FISHING, which provisional application is incorporated by reference herein in its entirety.

FIELD OF THE INVENTION

Exemplary embodiments of the disclosure relate generally to attachment and positioning of a strike indicator on a fishing line or leader for fishing. More particularly, exemplary embodiments of the disclosure relate to a strike indicator attachment tool aids in attachment of a yarn or wool strike indicator to a fishing line or leader for fly fishing, bait fishing, lure fishing and other types of fishing including spin fishing and ice fishing, on freshwater streams, rivers, ponds, lakes and saltwater estuaries, bays and oceans. Exemplary embodiments of the disclosure further relate generally to a strike indicator fabrication method for fabricating a strike indicator on a fishing line or leader.

BACKGROUND OF THE INVENTION

An example of a removable and reusable fish strike indicator for fishing is described in prior U.S. Pat. No. 5,216,831 (the '831 patent), which is incorporated by reference herein in its entirety. As discussed in the '831 patent, in fly fishing the line and leader provide the weight required for casting a fly, and any additional weight if added changes the casting characteristic of the fly line. Conventional "bobbers" are generally not used in fly fishing because of the weight limitation imposed by the above constraint. It is an essential requirement for a fish strike indicator that the weight of the indicator be compatible and in balance with the weight of the fly line and the leader.

Fly fishermen often use a wet fly which sinks after the fly is cast into water. Whenever a fish takes a fly, the fish will attempt to spit out the fly abruptly once the fly is in its mouth. A fish strike indicator is used to alert a fisherman, during the short interval a fish has a fly in its mouth, that a fish has taken the fly so that the fisherman can set the hook. The challenge is to provide a visible indicator for the fisherman while at the same time keeping the indicator sufficiently small and lightweight to match the characteristics of the fly line and leader.

Certain techniques have traditionally been used to provide lightweight and visible strike indicators, but the indicators so provided are usually not adjustable along a fly leader. One technique often used is to color the tip of a fly line for a few inches just before the attachment with the leader to make the fly line more visible. The disappearance of the colored portion of the line indicates a strike. Another technique is to use highly visible tape attached to the leader to provide the strike indication. But neither of these techniques provides an indicator easily adjustable along a leader.

Yarn or Wool is preferred strike indicator material for experienced fisherman as it is:
A. Extremely buoyant;
B. Lightweight;
C. Introduces minimal wind resistance so does not impact accuracy of cast;
D. Falls on water gently—thus not alarming the fish;
E. Can be dyed different colors to improve visibility during cloudy or bright days or diminished light at dusk or dawn;
F. Can be trimmed to the exact optimal size required by the fisherman based upon the specific fishing conditions including:
  F1: Weight of flies (larger strike indicator required to suspend heavier flies);
  F2: Turbulence of water (larger strike indicator required to see if water is turbulent);
  F3: Velocity of wind (smaller strike indicator required to minimize wind resistance);
  F4: Visibility due to amount of light available (larger strike indicator required due to low light level at dawn, dusk);
  F5: Attachment point on leader (smaller indicator required if close to flies to avoid alarming fish); and
  F6: Type of fish being targeted (different types of fish exhibit different behaviors and have different tolerances to disturbances and changes in their environment including seeing fisherman, size of strike indicator visible on surface of water, splashing, pressure waves and noise caused by wading fisherman, etc.—smaller indicator required if type of fish alarms quickly).

SUMMARY OF THE INVENTION

Exemplary embodiments of the disclosure are generally directed to a strike indicator attachment tool. An illustrative embodiment of the strike indicator attachment tool includes a tool handle, an elongated tool rod extending from the tool handle and a line or leader engaging hook in the tool rod.

Exemplary embodiments of the disclosure are further generally directed to a method of fabricating a strike indicator on a fishing line or leader. An illustrative embodiment of the method includes providing a strike indicator attachment tool having a line or leader engaging hook, snagging the fishing line or leader in the line or leader engaging hook, forming a loop in the fishing line or leader by sliding a strike indicator securing sleeve over the fishing line or leader, extending a bundle of strike indicator threads through the loop and cinching the strike indicator threads by sliding the strike indicator securing sleeve from the fishing line or leader over the bundle of strike indicator threads.

BRIEF DESCRIPTION OF THE DRAWINGS

Exemplary embodiments of the present disclosure will hereinafter be described in conjunction with the following drawing figures, wherein like numerals denote like elements, and wherein:

FIG. 1 is a perspective view of an illustrative embodiment of the strike indicator attachment tool, with multiple strike indicator securing sleeves placed on the tool preparatory to use of the tool;

FIG. 1A is a cross sectional view of the strike indicator attachment tool, taken along section line 1A in FIG. 1;

FIG. 2 is an exploded perspective view of the strike indicator attachment tool with multiple strike indicator securing sleeves on a tool rod of the tool;

FIG. 3 is a perspective view of an exemplary strike indicator securing sleeve;

FIG. 4 is a side view of an illustrative embodiment of the strike indicator attachment tool with an enlarged view of a fishing line or leader engaging hook on the end of the tool rod;

FIG. 5 is a side view of an alternative illustrative embodiment of the strike indicator attachment tool with an alternative tool handle;

FIGS. 7A-7G illustrate sequential steps in selective attachment of a strike indicator to a fishing line or leader; and FIGS. 7H-7K illustrate sequential steps in selective detachment of the strike indicator from the fishing line or leader.

DETAILED DESCRIPTION

Figure 6:
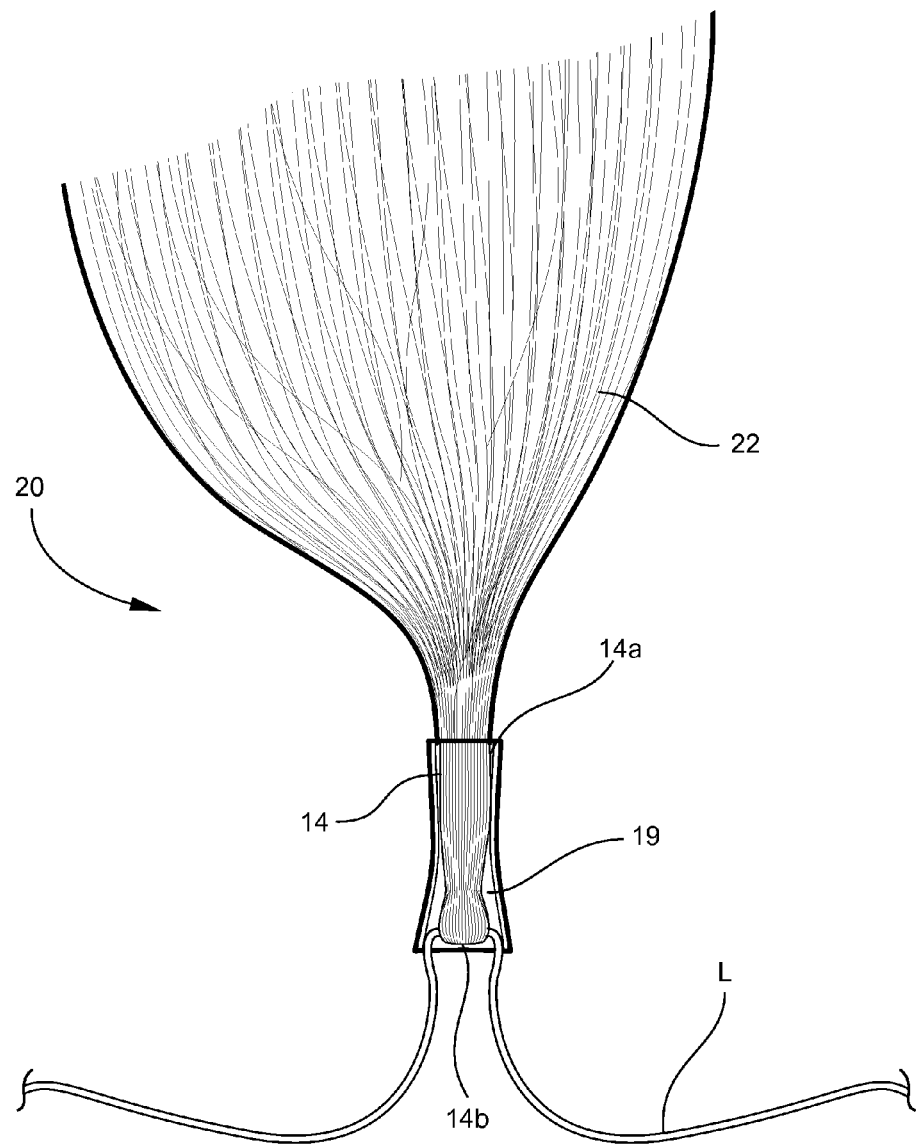
FIG. 6 is a sectional view of a strike indicator attached to a fishing line or leader via a strike indicator sleeve in application of the strike indicator attachment tool.

Various exemplary embodiments of the present disclosure are described below. Use of the term "exemplary" or "illustrative" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "various embodiments," and the like, may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

It is also noted that terms such as "preferably", "commonly", and "typically" are not utilized herein to limit the scope of the invention or to imply that certain features are critical, essential, or even important to the structure or function of the invention. Rather, these terms are merely intended to highlight alternative or additional features that may or may not be utilized in a particular embodiment of the present invention.

According to one exemplary embodiment, the present disclosure may include the following advantages and objectives:

A. Attachment tool requires minimal time to attach yarn or wool to a fishing line or leader;

B. Attachment tool requires minimal dexterity to use;

C. Attachment tool is lightweight and can be easily carried;

D. Attachment tool provides solution enabling the indicator to be easily adjusted along a fishing line or leader so the fisherman's fly, bait or lure can be suspended at the optimal depth;

E. Attachment tool provides solution enabling the indicator to be easily and quickly removed if the fly fisherman desires to switch from a sub surface fly to a surface (dry) fly;

F. Attachment tool provides solution enabling removal of strike indicator without causing any damage to the fishing line or leader—thus saving the fisherman the time and costs of replacing damaged fishing lines and leaders;

G. Attachment tool, tubing, wool or yarn indicator materials are low cost;

H. Attachment tool is simple to use;

I. Attachment tool and solution will work effectively in wet weather.

Exemplary embodiments of the present disclosure are described more fully hereinafter with reference to the accompanying drawings. Like numbers used herein refer to like elements throughout. Embodiments of the disclosure may be embodied in many different forms and should not be construed as limited to the particular embodiments set forth herein; rather, these embodiments are provided so that the disclosure will be operative, enabling, and complete. Accordingly, the particular embodiments disclosed herein are meant to be illustrative only and not limiting as to the scope of the invention. Moreover, many embodiments, such as adaptations, variations, modifications, and equivalent arrangements, will be implicitly disclosed by the embodiments described herein and fall within the scope of the present disclosure.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Referring initially to FIGS. 1-5 of the drawings, an illustrative embodiment of the strike indicator attachment tool, hereinafter tool, is generally indicated by reference numeral 10. The tool 10 may include a tool handle 12. As illustrated in FIG. 1, in some embodiments the tool handle 12 may be generally spherical. As illustrated in FIG. 5, in other embodiments the tool handle 17 may be generally elongated and cylindrical or any other suitable shape. In some embodiments, one or more loops or the like (not illustrated) may be provided on the handle 17 to facilitate attachment of the tool 10 to a vest, belt or other article of clothing (not illustrated) of a user of the tool 10. As illustrated in FIG. 2, an elongated tool rod 16 extends from the handle 12.

The tool rod 16 may have a proximal rod end 16a and a distal rod end 16b opposite the proximal rod end 16a. As further illustrated in FIG. 2, in some embodiments the proximal rod end 16a may be fitted into a rod opening 13 in the handle 12. The proximal rod end 16a may be friction-fitted in the rod opening 13 and/or may be glued and/or otherwise secured in the rod opening 13 using any other suitable attachment technique known by those skilled in the art. A fishing line or leader engaging hook 18 is provided in the tool rod 16 generally adjacent to the distal rod end 16b for purposes which will be hereinafter described. The distal rod end 16b may be tapered to facilitate ease in inserting the strike indicator securing sleeves 14 on the tool rod 16.

In application of the tool 10, which will be hereinafter described, at least one strike indicator securing sleeve 14 is placed on the tool rod 16. In typical application, multiple strike indicator securing sleeves 14 are placed on the tool rod 16. As illustrated in FIG. 4, the adjacent strike indicator securing sleeves 14 may be placed on the tool rod 16 in adjacent relationship to each other from the handle 12 to the fishing line or leader engaging hook 18. As illustrated in FIGS. 1A and 3, each strike indicator securing sleeve 14 may be generally elongated and cylindrical with a sleeve interior 19 which is sized and configured to accommodate the tool rod 16. Each strike indicator securing sleeve 14 may have a loop end 14a and a line end 14b opposite the loop end 14a.

The tool 10 may be manufactured using metal, plastic and/or any other suitable lightweight, rigid material which for a given size and shape would function for the intended purpose of the tool 10.

Referring next to FIG. 6 of the drawings, in exemplary application, the tool 10 can be used to fabricate a strike indicator 20 on a fishing line or leader L. The strike indicator 20 enables a fisherman (not illustrated) to discern the striking of a fish on the fishing line or leader L during fishing. In some applications, the fishing line or leader L may be wound on a reel (not illustrated) mounted on a fishing rod in the conventional manner. The strike indicator 20 may include a strike indicator securing sleeve 14 which secures multiple strike indicator threads 22 to the fishing line or leader L. The strike indicator threads 22 may be wool, yarn and/or other like flexible material and may be a highly-visible color such as orange, red or yellow, for example and without limitation. The ends of the strike indicator threads 22 protrude from the loop end 14a of the strike indicator securing sleeve 14. The fishing line or leader L enters and exits the line end 14b of the strike indicator securing sleeve 14. Inside the sleeve interior 19 of the strike indicator securing sleeve 14, the strike indicator threads 22 extend around the fishing line or leader L. Thus, the fishing line or leader L anchors, secures or retains the strike indicator threads 22 in the strike indicator securing sleeve 14.

Figure 7A:
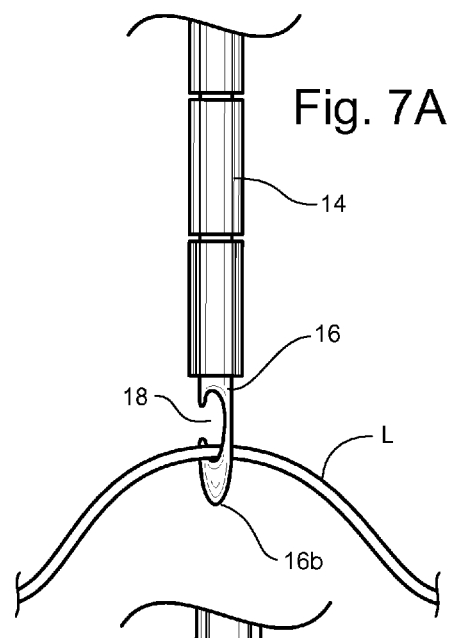
Figure 7B:
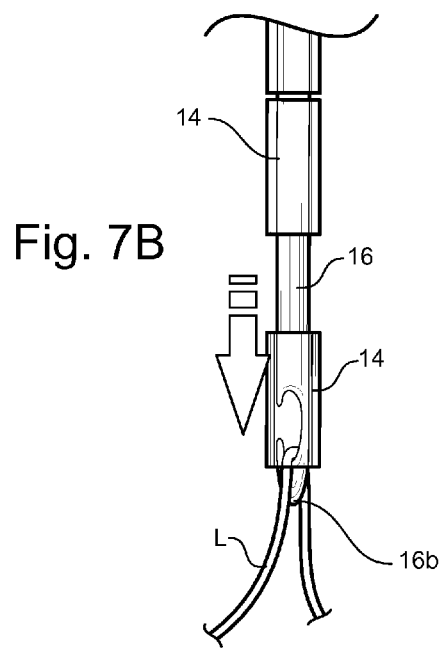
Figure 7C:
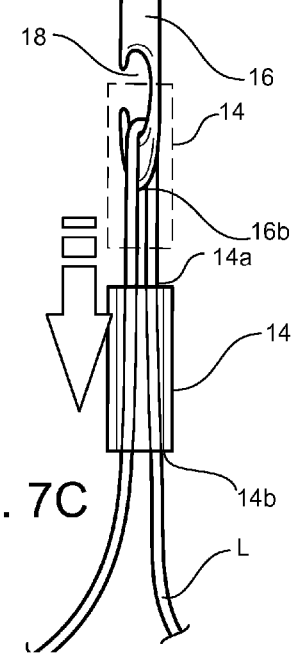
Figure 7D:
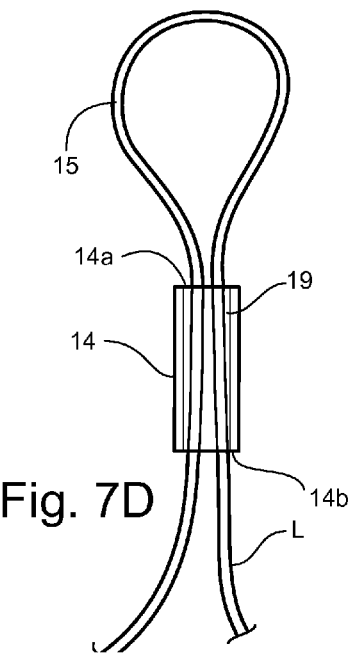

Referring next to FIGS. 7A-7K of the drawings, exemplary application of the tool 10 in sequentially fabricating the strike indicator 20 on the fishing line or leader L is illustrated. In FIG. 7A, the line or leader engaging hook 18 snags the fishing line or leader L at some point between the opposite ends (not illustrated) of the fishing line or leader L. In FIGS. 7B and 7C, the terminal strike indicator securing sleeve 14 on the tool rod 16 of the tool 10 is slid from the tool rod 16 over the line or leader engaging hook 18 and onto adjacent strands of the looped fishing line or leader L. In FIG. 7D, the loop 15 which the strike indicator securing sleeve 14 forms in the fishing line or leader L is detached from the line or leader engaging hook 18.

In FIG. 7E, a bundle of the strike indicator threads 22 is extended through the loop 15. In FIG. 7F, the size of the loop 15 is reduced by sliding the strike indicator securing sleeve 14 on the fishing line or leader L toward the strike indicator threads 22. Accordingly, the loop 15 cinches the strike indicator threads 22 of the bundle as illustrated in FIG. 7F, such as generally at the middle. In FIG. 7G, the fishing line or leader L is pulled through the strike indicator securing sleeve 14 from the loop end 14a toward the line end 14b such that the loop 15 draws the strike indicator threads 22 into the strike indicator securing sleeve 14 and the ends of the strike indicator threads 22 protrude from the loop end 14a of the strike indicator securing sleeve 14. It will be appreciated by those skilled in the art that multiple strike indicator securing sleeves 14 may be placed on the tool rod 16 in adjacent relationship to each other to facilitate fabrication of multiple strike indicators 20 to the same fishing line or leader L or to different fishing lines or leaders L.

After the strike indicator 20 is fabricated on the fishing line or leader L, a fly, jig, worm or other fishing lure (not illustrated) may be attached to the fishing line or leader L. The fishing rod (not illustrated) having the reel on which the fishing line or leader L is wound is used to cast the fishing lure into a lake, river or other water body (not illustrated). As the fishing lure floats on or is retrieved through the water body by operation of the reel, the strike indicator threads 22 of the strike indicator 20 are highly visible as they float and typically move in an undulating motion on or near the surface of the water body and follow the trajectory or path of the fishing line or leader L. In the event that a fish strikes the fishing lure, the fishing line pulls on the strike indicator 20, which rapidly disappears beneath the surface of the water body. Therefore, the disappearing or submerging strike indicator 20 indicates to the fisherman that a fish has struck the fishing lure such that the fisherman can play or reel in the fish in by operation of the rod and reel.

FIGS. 7H-7K illustrate sequential disassembly of the strike indicator 20 on the fishing line or leader L. In FIG. 7H, the strike indicator securing sleeve 14 is slid on the fishing line or leader L away from the strike indicator threads 22. This sliding action of the strike indicator securing sleeve 14 enlarges the loop 15 in the fishing line or leader L. In FIG. 7I, the bundle of strike indicator threads 22 is removed from the enlarged loop 15. In FIGS. 7J and 7K, the strike indicator securing sleeve 14 is removed from the fishing line or leader L by sliding the strike indicator securing sleeve 14 over the loop 15.

Based on the foregoing description, a number of advantages of the strike indicator attachment tool 10 become evident:

A. Attachment tool requires minimal time and effort to attach yarn or wool to a fishing line or leader;
B. Attachment tool requires minimal dexterity to use;
C. Attachment tool is lightweight and can be easily carried;
D. Attachment tool provides solution enabling the indicator to be easily adjusted along a fishing line or leader so the fisherman's fly, bait or lure can be suspended at the optimal depth;
E. Attachment tool provides solution enabling the indicator to be easily and quickly removed if the fly fisherman desires to switch from a sub surface fly to a surface (dry) fly;
F. Attachment tool provides solution enabling removal of strike indicator without causing any damage to the fishing line or leader—thus saving the fisherman the time and costs of replacing damaged lines and leaders;
G. Attachment tool, tubing, wool or yarn indicator materials are low cost;
H. Attachment tool is simple to use; and
I. Attachment tool and solution will work effectively in wet weather.

Accordingly, it will be appreciated by those skilled in the art that the tool 10 renders the strike indicator 20 easily installed, removed, and stored for reuse. The strike indicator 20 can be easily placed at any location along a static fishing line or leader L without access to the terminal ends of the fishing line or leader L. The fly or fishing lure and weight can therefore remain attached to the fishing line or leader L. The strike indicator 20 may be fabricated without hard or abrasive surfaces which may otherwise have a tendency to damage a delicate fishing line or leader L and the stretchable strike indicator securing sleeve 14 may provide a non-slip installation of the strike indicator 20 on the fishing line or leader L. Furthermore, the strike indicators 20 may have additional advantages in that the strike indicators 20 can be made in a broad range of sizes, shapes, and weights to match an equally broad range of fishing conditions and styles including but not limited to spin and bait fishing. Moreover, the strike indicator 20 can be easily installed with wet hands and in wet weather using the tool 10.

Although the foregoing description and the drawings describe and illustrate many structural details and features, these should not be construed as limiting the scope of the appended claims but as merely providing illustrations of some of the illustrative embodiments of the disclosure. For example and without limitation, the tool rod 16 of the strike indicator application tool 10 and the strike indicator securing sleeves 14 can be made in a broad range of sizes to match various fishing requirements. The tool rod 16 and strike indicator securing sleeves 14 can be made out of any material which will meet the functional requirements of the application such as wood, plastic, metal, rubber, etc.

For the purposes of describing and defining the present disclosure it is noted that the use of relative terms such as "substantially", "generally", "approximately", and the like may be utilized herein to represent an inherent degree of uncertainty that may be attributed to any quantitative comparison, value, measurement or other representation. These terms may also be utilized herein to represent the degree by which a quantitative representation may vary from a stated reference without resulting in a change in the basic function of the subject matter at issue.

Exemplary embodiments of the present disclosure are described herein above. No element, act, or instruction used in this description should be construed as important, necessary, critical, or essential to practice the various embodiments unless explicitly described as such. Although only a few of the exemplary embodiments have been described in detail herein, those skilled in the art will readily appreciate that many modifications are possible in these exemplary embodiments without materially departing from the novel teachings and advantages of this disclosure. Accordingly, all such modifications are intended to be included within the scope of this disclosure as described herein.

While exemplary embodiments of the disclosure have been described above, it will be recognized and understood that various modifications can be made and the appended claims are intended to cover all such modifications which may fall within the spirit and scope of the disclosure.

What is claimed is:

1. A strike indicator attachment tool, comprising:
   a tool handle;
   an elongated tool rod extending from the tool handle;
   a line or leader engaging hook along the tool rod; and
   a plurality of discrete strike indicator securing sleeves carried by the tool rod in an adjacent series and in communication with each other between the tool handle and the line or leader engaging hook, wherein the plurality of discrete said sleeves abut one another, and each of the plurality of discrete strike indicator securing sleeves can be independently and sequentially slid freely over said engaging hook;
   wherein at least one strike indicator securing sleeve is positioned adjacent to the line or leader engaging hook, and
   wherein the at least one strike indicator securing sleeve is configured to enable formation of a loop in the line or leader.

2. The strike indicator attachment tool of claim 1 wherein the tool rod has a proximal rod end carried by the tool handle and a distal rod end opposite the proximal rod end.

3. The strike indicator attachment tool of claim 1 wherein the at least one strike indicator securing sleeve comprises a sleeve interior sized and configured to accommodate the tool rod.

4. The strike indicator attachment tool of claim 1 wherein the at least one strike indicator securing sleeve is generally elongated and cylindrical.

5. The strike indicator attachment tool of claim 2 wherein the line or leader engaging hook is generally adjacent to the distal rod end.

6. The strike indicator attachment tool of claim 2 wherein the distal rod end is tapered.

\* \* \* \* \*